Feb. 18, 1930.                    W. RYDBERG                    1,747,954
                    MACHINE FOR FORMING BAKING UNITS FROM DOUGH
                       Filed June 8, 1926           7 Sheets-Sheet 1
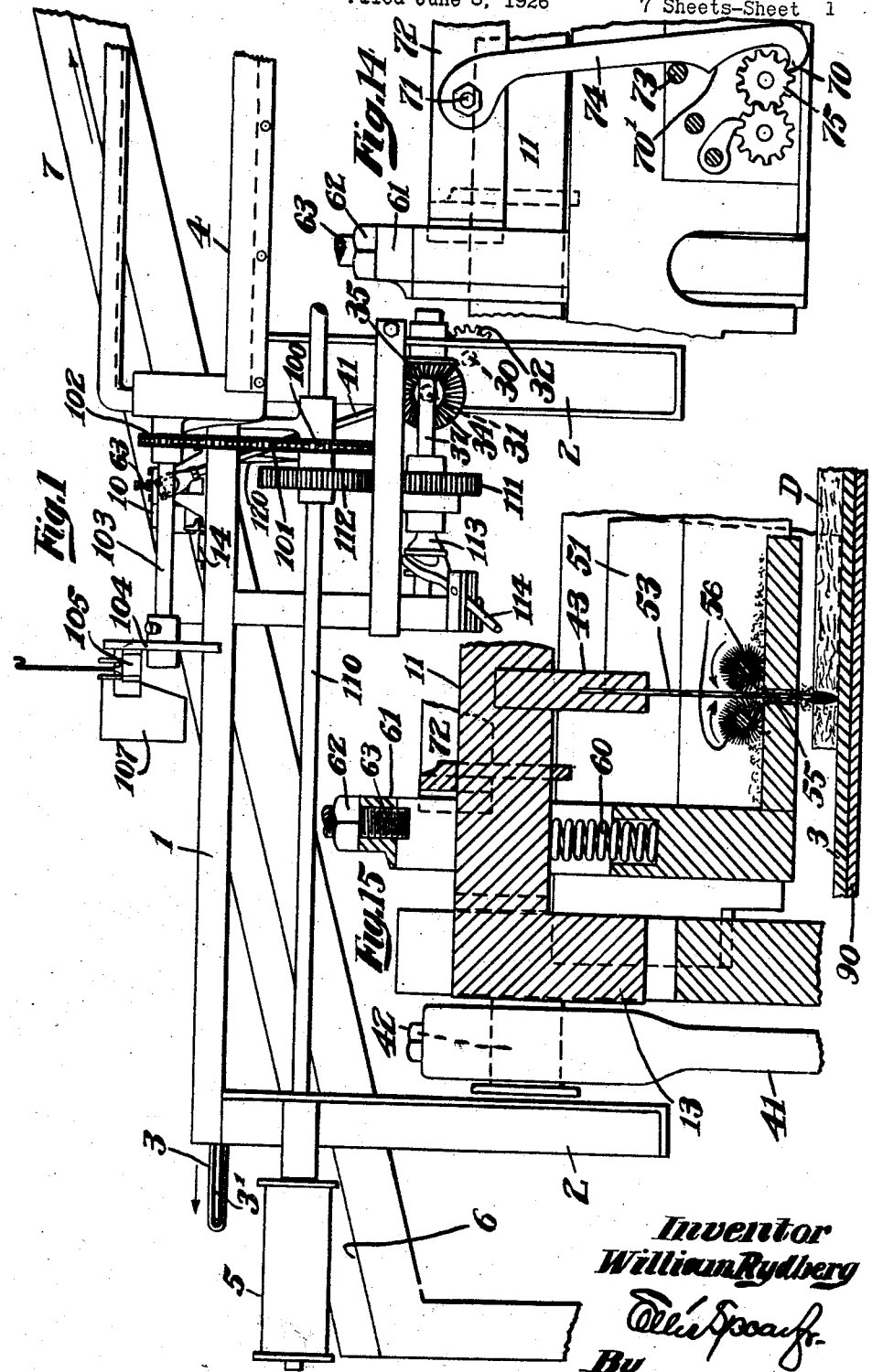
Inventor
William Rydberg
By Ellis Spackman
Attorney

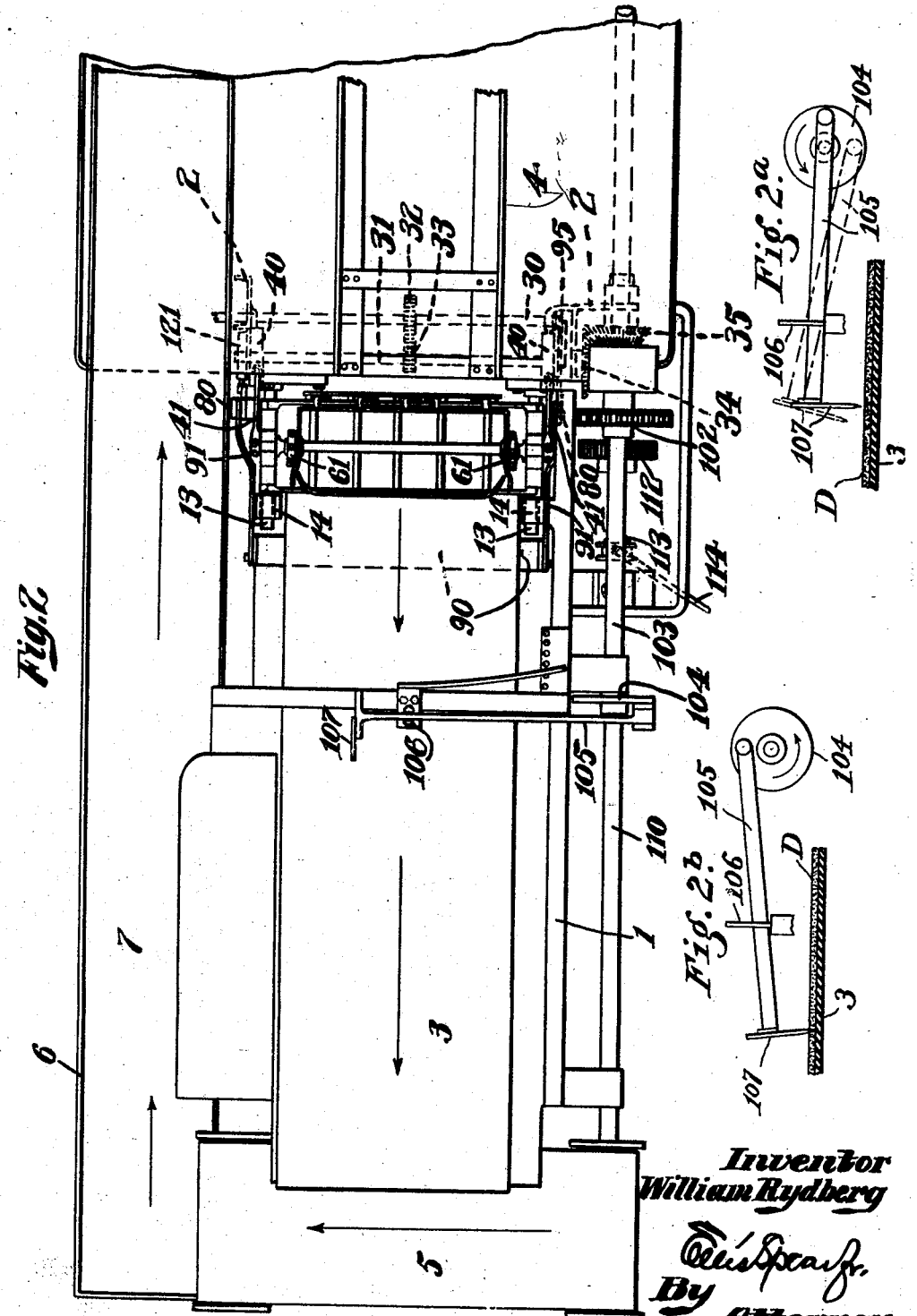

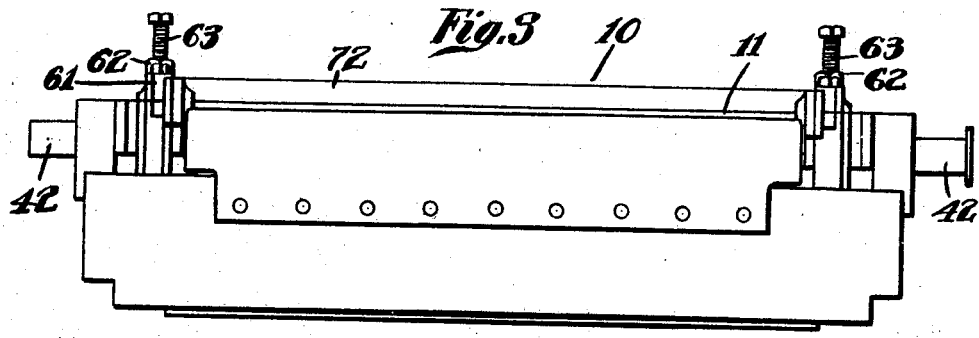
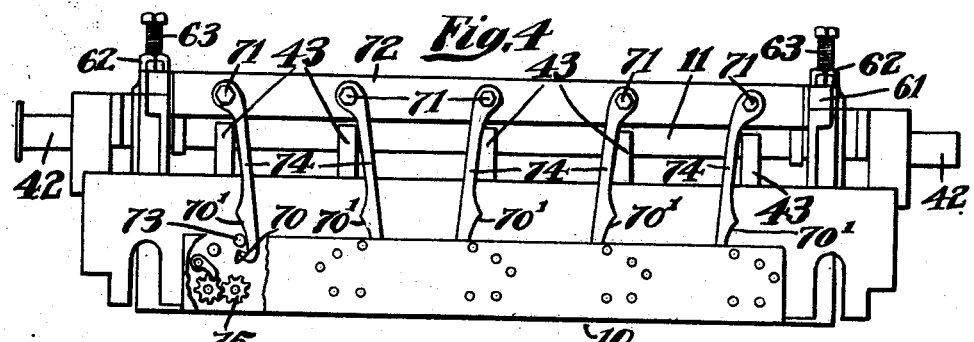
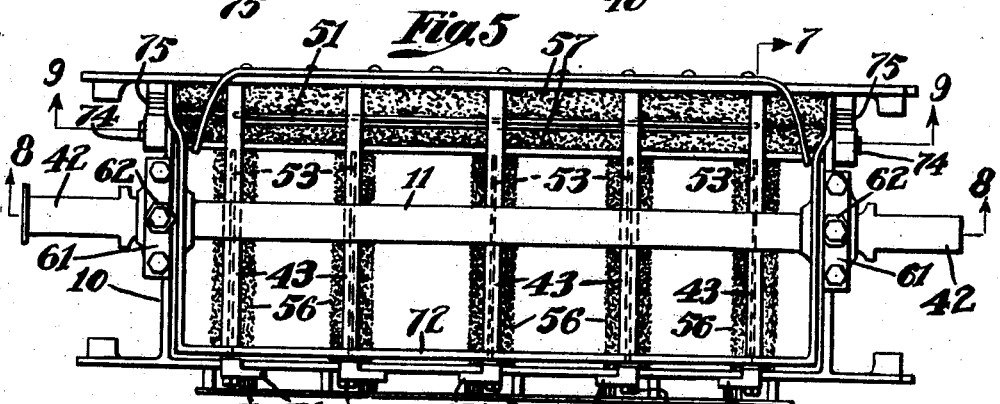
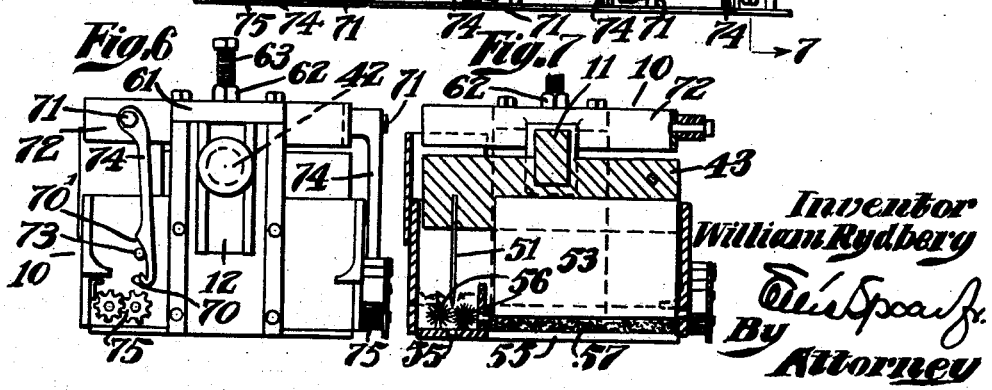

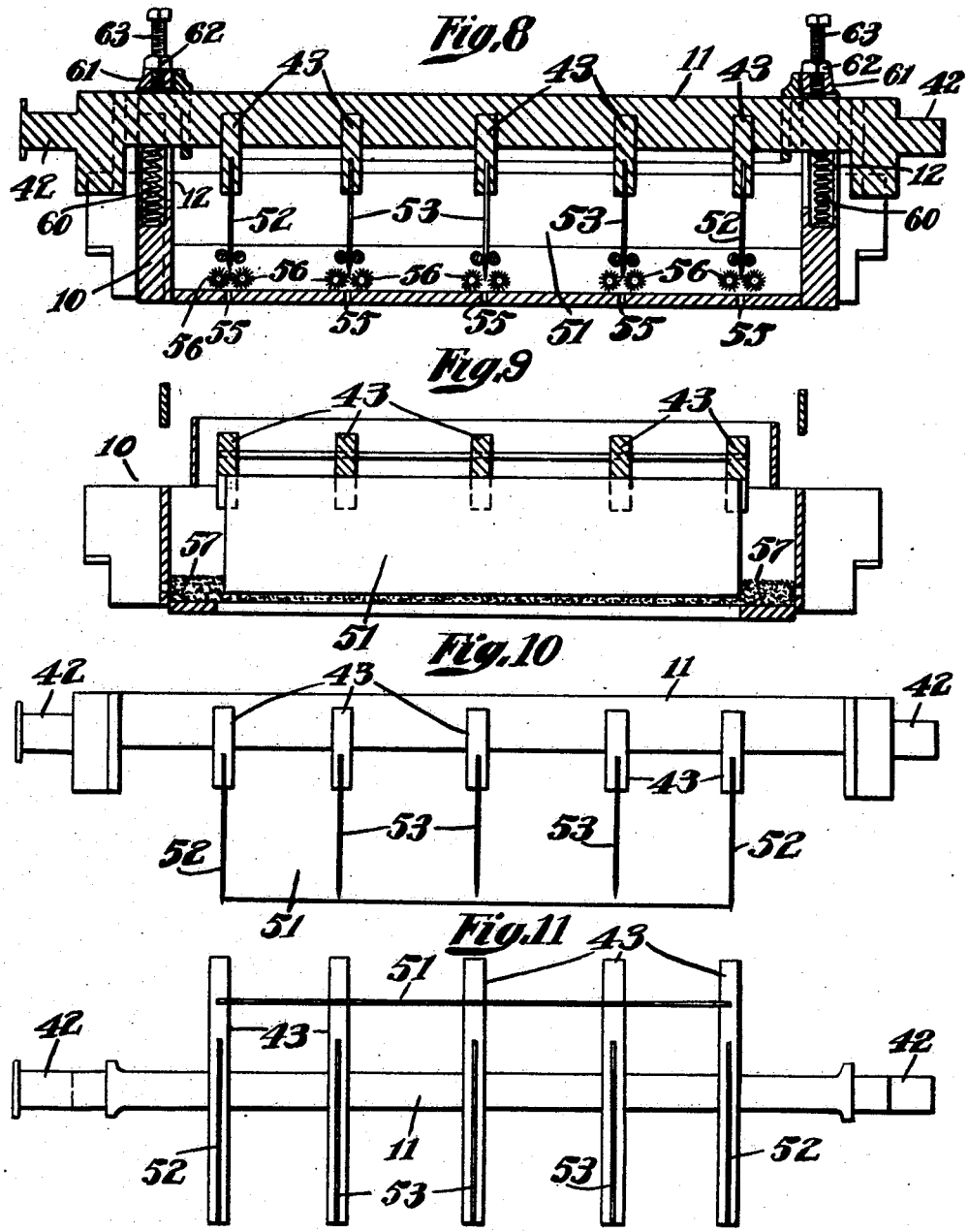

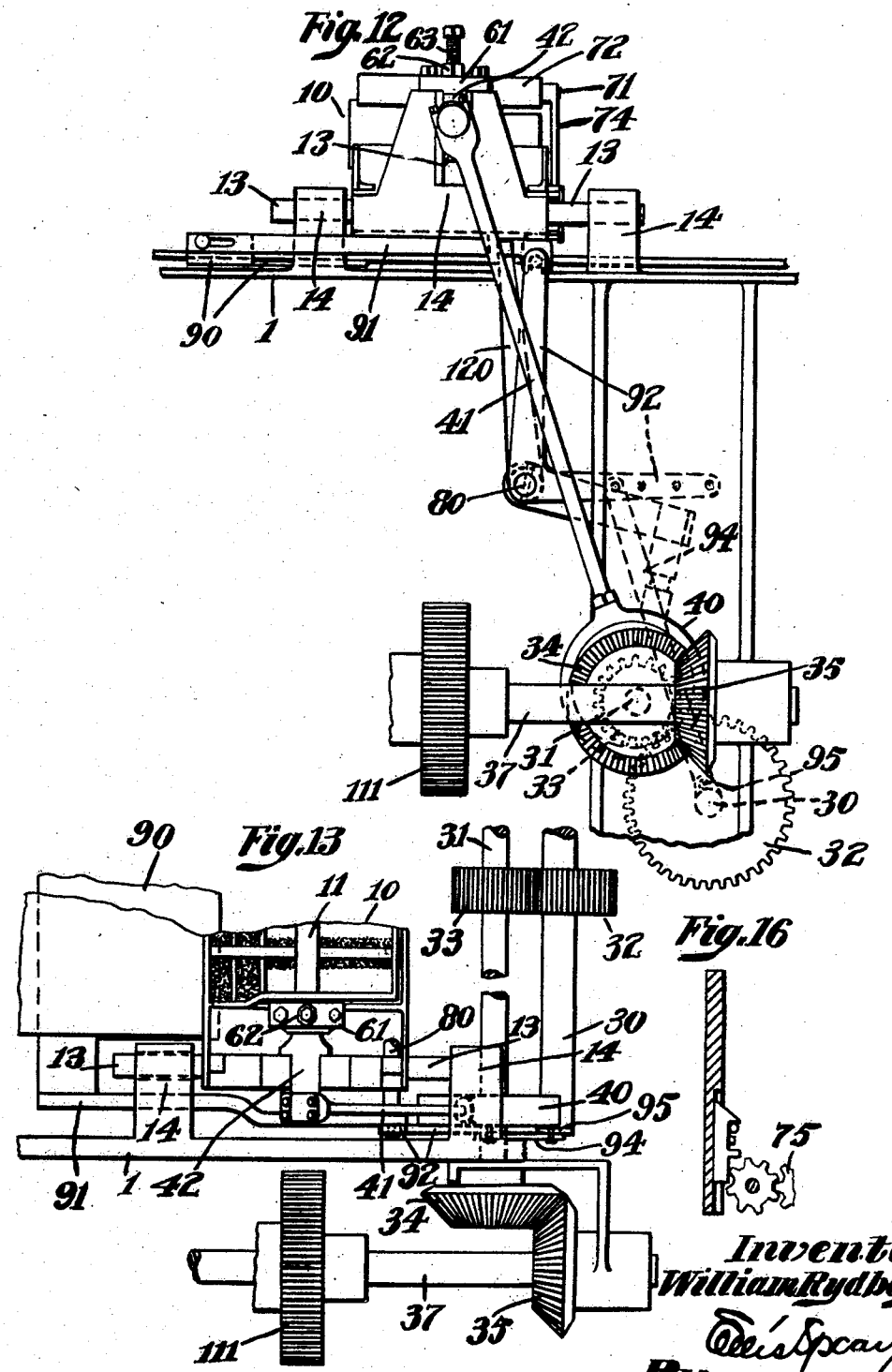

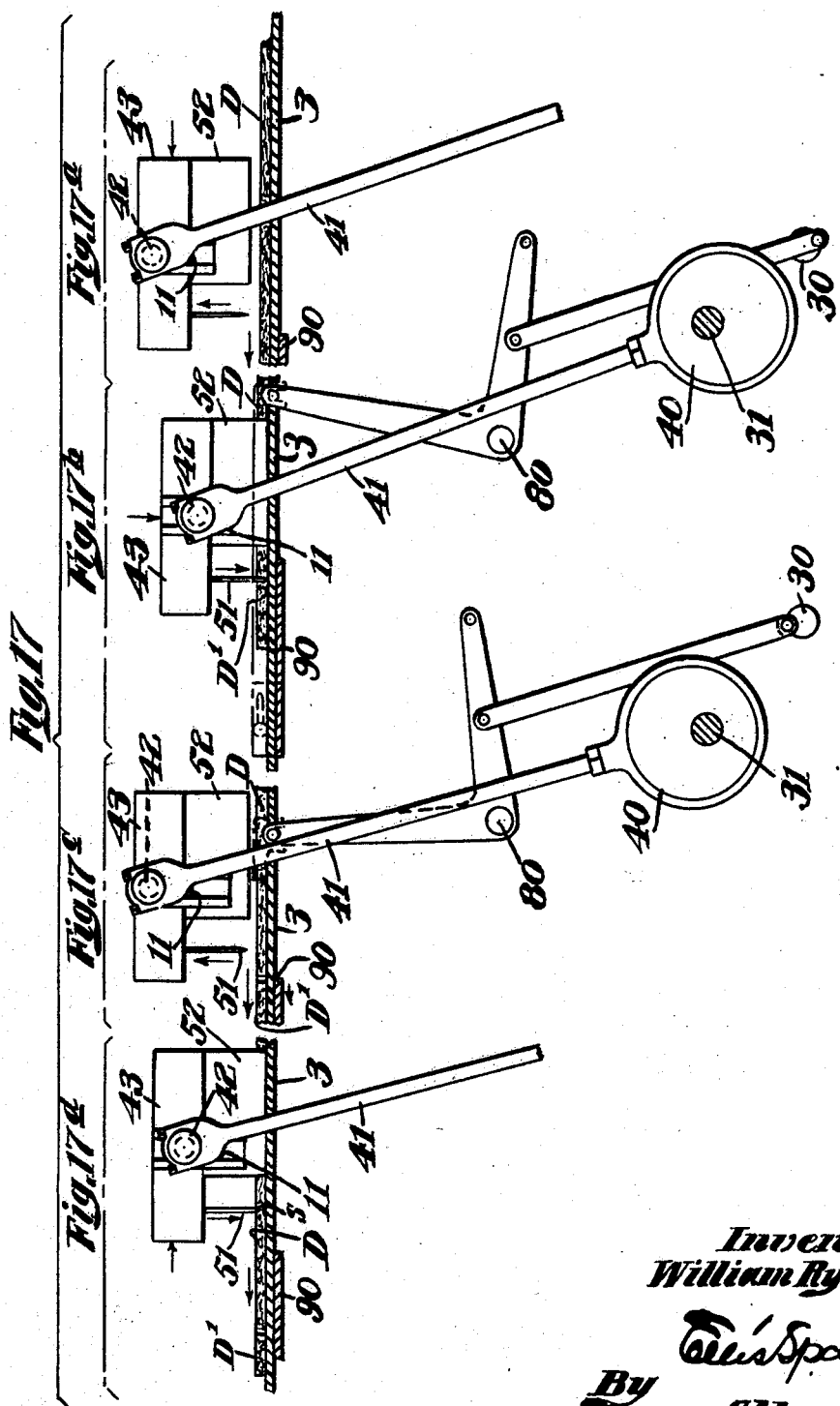

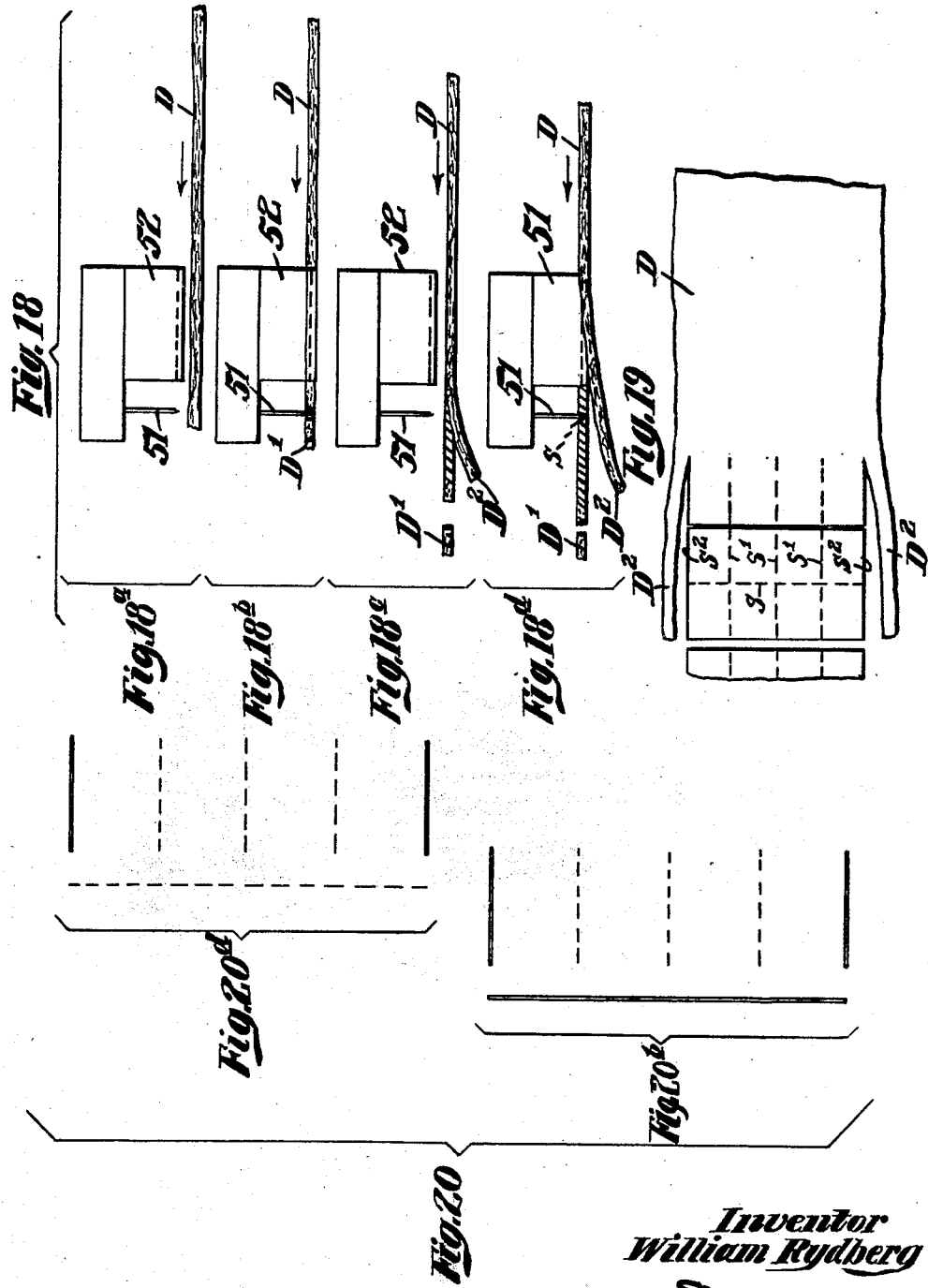

Patented Feb. 18, 1930

1,747,954

UNITED STATES PATENT OFFICE

WILLIAM RYDBERG, OF WAVERLEY, MASSACHUSETTS

MACHINE FOR FORMING BAKING UNITS FROM DOUGH

Application filed June 8, 1926. Serial No. 114,531.

My invention herein involved relates to the formation of cut and scored sheets from dough preparatory to the baking of the same and particularly to the continuous production of such sheets from a dough mix whereby the product of the desired shape, size and configuration may be produced rapidly and uniformly.

In certain types of bread products, notably those of the thin type from creamy or beaten batters, it is frequently desired to produce units for baking that are partly cut and partly scored.

As illustrative of the purposes of and uses of my invention, I call attention to a particular type of product as well illustrating the difficulties involved by the nature of the product and the advantages gained by the practice of my invention.

In the particular type which I shall employ as illustrative, the dough is formed in a thin sheet which in a characteristic form is cut into rectangular shape and so scored as to be divisible into still smaller units.

One well known type of such a product is generally known as Swedish bread or Swedish crackers which have usually heretofore been made by rotary devices which formed and cut the slabs for baking. There have been a considerable number of difficulties in this operation due partly to the difficulty in getting a sufficient scoring without breaking through the sheet and on the other hand in getting a clean cut where a line of severance was desired. The difficulties in general arose out of the character of the dough used which is generally of whole grain, and in considerable part upon its adherence to the knives or cutting members which became encrusted with the dough, thus preventing uniformity in the product and making for a large amount of wastage. Moreover, such dough has to be handled quickly as it rapidly loses its light consistency. In practice it is usually chilled and cut while cold. If there is delay in handling it warms up and settles, losing its lightness derived from the baking.

My invention contemplates a machine for the purpose specified which is capable of sustained operation with great uniformity and perfection of output, so that the ovens may be rapidly charged and the product baked without stoppage and delay and with a high uniformity both in the product as manufactured and in the subsequent sub-dividing of the product in the hands of the consumer or at the bakery when packed in cracker form. It will be understood that in the case of products of this sort, that are scored for subdivision, a considerable degree of economy is involved in the efficiency of the scoring so that the larger units can be broken apart along predetermined lines after they are put through the dusters, without having them fly to pieces in irregular and unsalable shapes.

I have shown in the accompanying drawings a machine well adapted to practical bakery use and well adapted to illustrate the principles of my invention and have also indicated somewhat diagrammatically the method mechanically performed by the machine. Throughout the specification and drawings like reference characters are employed to indicate corresponding parts, and in the drawings:

Fig. 1 is a side elevation of a machine in accordance with my invention.

Fig. 2 is a plan view of the same.

Figures 2ª and 2ᵇ are front elevations showing the scraper for trimming the edge of the dough; the relative position of the scraper blade, during the different portions of the revolution of the actuating crank mechanism is illustrated, showing the manner in which the intermediate bearing 106 serves as a guide to cause the scraper blade 107 to come in contact with the conveyor to trim the edge during one portion of the revolution of the rotary member 104; the guide 106 serves to intercept and guide the return movement of the transverse arm 105 and cause the scraper blade 107 to be lifted or raised from the conveyor.

Fig. 3 is a front elevation of the cutter box.

Fig. 4 is a rear elevation of the cutter box.

Fig. 5 is a plan thereof.

Fig. 6 is an end view.

Fig. 7 is a section on the line 7—7, of Fig. 5.

Fig. 8 is a longitudinal section on the line 8—8, of Fig. 5.

Fig. 9 is a similar section on the line 9—9, of Fig. 5.

Fig. 10 is a side view of cutter bar and cutter removed.

Fig. 11 is a bottom plan of the same.

Fig. 12 is a fragmentary view showing the cutter box and controls.

Fig. 13 is a plan showing the parts in Fig. 12 similarly treated.

Fig. 14 is a fragmentary view of brush driving mechanism about to operate.

Fig. 15 is an enlarged fragmentary section with the knife in cutting position and brushes about to operate.

Fig. 16 is a detail of the back pawl arrangement for the brush drive.

Fig. 17 is a series of views of successive phases of biscuit forming movement including:

Fig. 17$^a$ which shows the knife in raised position.

Fig. 17$^b$ which shows the knife in cutting position.

Fig. 17$^c$ which shows the knife raised again.

Fig. 17$^d$ which shows the scoring position.

Fig. 18 is a side diagram of the dough and knives as in Fig. 17.

Fig. 19 is a plan view of the formed and cut off biscuit and strip.

Fig. 20 is a diagrammatic view illustrating the overlap of the cutting and scoring operations due to the difference in travel of belt and box.

Referring to the drawings and starting with Fig. 1 it will be seen that the machine shown consists of a bed 1 supported on any convenient legs or frame as at 2. In the bed 1 is a continuous conveyor 3 running in alinement with a dough delivery 4 so that the dough coming from the mixers is continuously rolled into a sheet and delivered to the conveyor 3 running over a plate 3$^1$. From this conveyor the cut and formed units are removed and conveyed to the ovens while scrap is carried on a cross conveyor 5 dropped into a chute 6 and returned to the dough supply on a conveyor 7.

Adjacent the dough supply and disposed above the conveyor 3 is a cutter box 10 in which is a cutter block 11 mounted for vertical reciprocation in a slot 12 and carrying the cut off and scoring blades later to be described. The cutter box 10 is mounted for reciprocation parallel with the line of travel of the belt 3 it being provided with slide bars 13 working in slide bearings 14 on the bed 1. This movement is effected by a rocker arm 120 on the shaft 80 to which the box is connected by a stud and fork.

The shaft 30 is a transverse shaft geared to the shaft 31, by the meshing of its own pinion 32 with the pinion 33 on the shaft 31. The shaft 31 through the bevel pinions 34 and 35 drives a shaft. This shaft drives the shaft 110 through a pair of gears 111 and 112. The gear 111 is loose on the shaft 37 but engageable therewith by a clutch 113 and lever 114. The shaft 110 is disposed longitudinally of the machine and carries at its end the driving roll of the cross conveyor belt 5.

On the shaft 31 is an eccentric 40 connected by a rod 41 to a trunnion 42 on the cutter block 11 projecting through the slot 12 so as to clear the cutter box 10. The eccentric 40 provides intermittent raising and lowering of the cutter block 11 to bring the cutting and scoring knives into action on the dough sheet.

At this point it is desirable to consider the novel steps involved in the production of such an article. For this purpose I have provided a series of diagrams grouped under Fig. 17. In Fig. 17$^a$ I have indicated at D a strip of dough coming from the rollers and carried along on the belt 3. We may consider Fig. 17$^a$ as illustrating the preliminary movement of the machine just previous to the first cut. In this it will be noted that the end of the dough strip has been carried just beyond the transverse knife 51. This transverse knife is both a cutting and a scoring knife as will be later explained, as it alternately cuts and scores in alternate depressions of the block 11. Associated with the knife 51 are lateral cutting knives 52. These are really edge trimming knives and make their cut in each operation. Between the two edge trimming knives 52 are a plurality of scoring blades 53 slightly shorter in length which score the sheet centrally at each reciprocation of the block 11.

In Fig. 17$^b$ the block 11 is shown in its first descent and the blade 51 is shown as cutting off the dough at the end of the strip as indicated at D$^1$. At the same time that this is done the edge cutters 52 have partially severed a strip D$^2$ from along the edge of the strip while the scoring knives 53 are making the initial score.

In Fig. 17$^c$ I have shown the strip of dough D as having run partially past the knives and being in a position for the next descent. In each case the cutter block 11 makes the same descent but in making the second cut in the series of Fig. 17, the cutting blade 51 does not cut through the dough strip completely as will be hereinafter described. In its contact, however, as shown in Fig. 17$^d$, the side cutters 52 perform their full cutting operation and sever the marginal portion of the dough strip. In doing this the side trimming knives 52 slightly overlap the first cut made as indicated in 17$^b$, so that the lateral trimming is continuous. The means of accomplishing this will be more fully described later.

These four figures may be considered as representing the cycle as the next operation will again appear as in Fig. 17$^a$ where the knives are raised for the next cutting off stroke as in Fig. 17$^b$, and the first unit will be cut off by the transverse cutter 51 which at that time again makes a complete severance of the dough strip.

I have endeavored to illustrate in Fig. 18 a plan view diagrammatic of the condition of the dough sheet as shown in Fig. 17$^d$. In this case I have indicated by the brackets $b$ and $d$ the overlapping phases of the cuts indicated in Figs. 17$^b$ and 17$^d$. In Fig. 17 it will be noted that the end of the dough sheet has been transversely trimmed to separate the end portion D$^1$. Parallel to this and half way down the length of the dough unit being formed is a transverse scoring indicated in dotted lines $s$ which indicates the scoring made by the cutter 51 in the movement indicated in Fig. 17$^d$. I have also indicated longitudinal scorings $s^1$ and $s^2$, which provide a continuous line of score lengthwise of the plan. The completely severed unit is illustrated in Fig. 20, showing its form when released by the cutter 51 in its second cutting movement.

Referring again to the mechanical structure, I have shown in Fig. 8, the construction and mounting of the knives. The bar 11 is held in normally raised position in the box 10 by the springs 60 their upward movement being checked by a threaded stud 63 held by a lock nut 62 in a cross plate 61 which closes the end of the slot 12 in the box 10. On the bar 11 are blade carriers 43 for the longitudinal cutting blades 52 and the longitudinal scoring blades 53. These carriers also support the transverse knife 51.

The bottom of the box 10 is slotted to permit the passage of the knives 51, 52 and 53. Adjacent the knife slots 55 at the bottom of the box 10 are mounted pairs of brushes 56. The bottom of the box 10 is adapted to receive a body of flour in which the brushes 56 rotate for cleaning and powdering the knife blades as they pass in their reciprocating movements in the box.

The brushes 56 shown in Fig. 8 are disposed longitudinally of the carrier. A similar pair of brushes 57 are disposed adjacent the transverse knife 51 for a like purpose as appears in Fig. 5. The brushes are rotated intermittently by hooks 70 pivoted at 71 in cross frames 72. These hook latches 70 have cam faces 70$^1$ which bear on the pins 73, to clear the hooks at the end of their stroke. A lever 74 is freely mounted on the end of the brush shaft on which is a pinion 75. A pair of these pinions (one on each brush shaft) intermesh so as to be driven together so that each time the lever 74 is rocked on the upward movement of the knife bar the brushes will be rotated to wipe it clean and stir up the flour adjacent the blade. In Figs. 6 and 7 these similar mechanisms are shown for both the longitudinal and transverse brushes, the same also being shown in Fig. 4 where the side blade is partly broken away to show a pair of the gears. The structure is shown in larger details in Fig. 14.

I have heretofore referred to a relative movement between the cutter box and the belt. There is, of course, the continuous movement of the belt relative to the cutter box, but the cutter box has another movement hereinbefore referred to through the rocker arm 120 operated by the cam 121 on the shaft 31, which gives it a back and forth motion relative to the belt, so that the cutter box has a slight movement of travel at the same speed as the belt when the knives are contacting and makes a corresponding slight rear movement to resume its position relative to the belt and so as to reposition itself relative to the oncoming strip of dough so that it will make an overlap in its side trimming cut and longitudinal scoring, as indicated in Fig. 19.

In addition to the movement of the belt and the knife box the transverse cutting and scoring operations are dependent upon the position of a belt supporting slide 90 reciprocated by a link 91 connected to a bell crank lever 92 pivoted freely on the shaft 80 and rocked by a link 94 connected to a crank 95 on the shaft 30. The positions of the supporting slide 90 are illustrated in several views of Fig. 17. It will be noted that in the cutting position shown in Fig. 17$^b$, the slide 90 is supporting the belt beneath the transverse knife 51 to insure a complete cut through the dough. In Fig. 17$^d$, the slide 90 is displaced relative to the knife so that the slight sag in the belt permits a scoring by the knife rather than a cutting through the dough.

Tracing through the operations of the machine, power is applied through the shaft 30 transversely of the machine. This shaft carries the eccentric 95 for operating the slide 90. It is geared to a parallel cross shaft 31 through the two to one gearing 32, 33. The shaft 31 drives the longitudinal shaft 37 through the gearing heretofore described with its intermediate shafting and clutch control. The longitudinal shaft 37 drives the transverse conveyor 5.

The shaft 37 carries a sprocket 100 which is switched to a chain 101 and sprocket 102 which drives a shaft 103 mounted on the frame 1. On the end of the shaft 103 is a disc 104 to which is pivoted a transverse arm 105 which has an intermediate bearing 106. This imparts to the scraper 107 a reciprocating transverse motion which brings it in contact with the severed edge of the dough strip so that the several edge is pushed off on to the upward conveyor 7 and carried back to the dough supply. A similar reversely acting pusher may be employed for the other side of the dough strip but in actual practice this is not really necessary. The attendant who stands at the end of the machine adjacent the cross conveyor 5 removes the cut and scored sections with a broad paddle. If one side of the dough is trimmed he is able to remove the sections without difficulty, leaving the trimmed edge that has not been removed to drop off at the end of the conveyor 3 on to the cross conveyor 5.

The shaft 31 operates the raising and lowering of the knives through its eccentric 40. The reciprocating movement of the knife box 10 is controlled by the eccentric 95 on the shaft 30.

With the power thus applied and with the dough fed from the supply 4 to the conveyor 3, the knife box is successfully raised and lowered as indicated in the series of views constituting Fig. 17. During this movement the slide 90 is alternately brought under the transverse knife 51 and removed therefrom so as to support the belt at alternate downward movements of the transverse knife so as to effect a cutting in one movement and a scoring in another movement.

During the vertical movements of the blades in the knife box 19, the knife box is making a reciprocating motion with reference to the belt 3 as heretofore described. During the vertical movements the knives are being cleared and dusted with flour by the brushes which are intermittently rotated by the ratchet mechanism.

The formed and severed dough units are carried along on the conveyor 3 clear of the forming mechanism and to the left of Fig. 1 and are removed and carried to the ovens for baking. The scrap is returned to the dough supply 4 by the transverse conveyor 5 and upward carrier 6.

While the practice of my invention is illustrated by reference to a single typical product made in certain steps, it will be readily seen that the product might be variously formed, scored and cut and that the steps also may be varied. Furthermore, the apparatus shown may be variously connected up and the parts redesigned and operated, all without departing from the spirit of my invention.

What I therefore claim and desire to secure by Letters Patent is:

1. In a machine of the class described, a continuously moving conveyor, means for feeding the continuous dough strip thereto, transverse and longitudinal blades disposed to produce successive longitudinal overlapping contact, means for vertically reciprocating said blades, a conveyor support and means for intermittently bringing the conveyor support into line with a transverse blade to insure a cutting contact, and in withdrawing said support to permit a scoring contact, means for intermittently moving said blades along with said conveyor during their contact with the dough.

2. In a machine of the class described, a continuously moving conveyor, means for feeding the continuous dough strip thereto, a blade box having a flour compartment, transverse and longitudinal blades mounted therein, means for vertically reciprocating said blades, and means for intermittently moving the blade box along with said conveyor during their contact with the dough and means within the flour compartment for agitating the flour to insure coating of the blade as it is moved therethrough.

3. In a machine of the class described, a continuously moving conveyor, means for feeding the continuous dough strip thereto, a blade box, transverse and longitudinal blades mounted therein, means for vertically reciprocating said blades, means for intermittently moving the blade box along with said conveyor during their contact with the dough, and means within the blade box for clearing the blades in raised position.

4. In a machine of the class described, a continuously moving conveyor, means for feeding the continuous dough strip thereto, a blade box having a flour compartment and a slotted bottom, transverse and longitudinal blades mounted in said box, means for vertically reciprocating said blades through said compartment and slotted bottom, and revoluble brushes in said compartment for clearing the blades in raised position.

5. In a machine of the class described, a continuously moving conveyor, means for feeding the continuous dough strip thereto, a blade box having a flour compartment and a slotted bottom, transverse and longitudinal blades mounted in said box, means for vertically reciprocating said blades through said compartment and slotted bottom, means for intermittently moving said blade box along with said conveyor during their contact with the dough, and revoluble brushes in said compartment for clearing the blades in raised position.

6. In a machine of the class described, a conveyor, a knife box, means for reciprocating the knives in the knife box vertically of the conveyor, said knife box including a bottom flour chamber slotted to permit the passage of the knives, a pair of rotatable brush members disposed on each side of said slot adapted to contact the blade in its reciprocation, and means for rotating said brushes to clear the blades and agitate the flour.

7. In a machine of the class described, a knife box, a conveyor means for vertically reciprocating the knives in the knife box vertically of the conveyor, said knife box including a flour chamber and a bottom slotted to permit the passage of the knives, a pair of rotatable brush members disposed on each side of said slot adapted to agitate the flour and coat the blade therewith in its reciprocation, and means for rotating said brushes.

8. In a machine of the class described, a conveyor, a knife box, means for moving the knife box longitudinally of the conveyor, means for reciprocating the knives in the knife box vertically of the conveyor, said knife box including a bottom flour chamber slotted to permit the passage of the knives, a pair of rotatable brush members disposed on each side of said slot adapted to contact the blade in its reciprocation, means for rotating said brushes to clear the blades and agitate the flour.

9. In a machine of the class described for treating a dough like product, a blade box having a flour compartment and a slotted bottom, a blade mounted in said box, means for vertically reciprocating said blade through said compartment and slotted bottom, and revoluble brushes in said compartment for agitating the flour to insure coating of the blades with flour or the like.

10. In a machine of the class described, a continuously moving conveyor, means for feeding the continuous dough strip thereto, a blade box having a compartment for flour or the like, and a slotted bottom, a blade mounted in said box, means for vertically reciprocating said blades through said compartment and slotted bottom, means for intermittently moving said blade box along with said conveyor during their contact with the dough, and revoluble brushes for agitating the flour or the like in said compartment for coating the blade with flour or the like as said blade is passed through and withdrawn from the slotted bottom.

11. In a dough cutting machine, a continuous conveyor, a trimmer for the edge thereof and an edge scraper comprising a transverse arm, a central bearing therefor arranged to intermittently intercept and guide said arm, a scraper blade on one end of the arm, and rotating means for the other end of the arm for imparting to the scraper an outward and downward scraping motion, and said central bearing serving as a guide to intercept the return movement of the scraper so as to impart an upward and backward motion to the scraper blade clear of the dough strip.

12. A pusher for clearing a trimmed edge from a continuous strip, comprising a transverse arm, a scraper blade at one end thereof, a crank member connected to the other end of the arm, and a guide bearing intermediate the ends of the transverse arm and in line with the inner edge of the trimming and the crank connection, and so disposed relative to the crank member and edge of the strip as to intermittently intercept and guide the arm so as to cause the scraper blade to be alternately lowered and moved transversely of the strip and to be lifted from the strip as the transverse arm is reciprocated by the crank member.

In testimony whereof I affix my signature.

WILLIAM RYDBERG.